July 11, 1933. W. A. RIDDELL 1,917,330
PHOTOGRAPHIC SHUTTER CONTROL
Filed Feb. 13, 1932
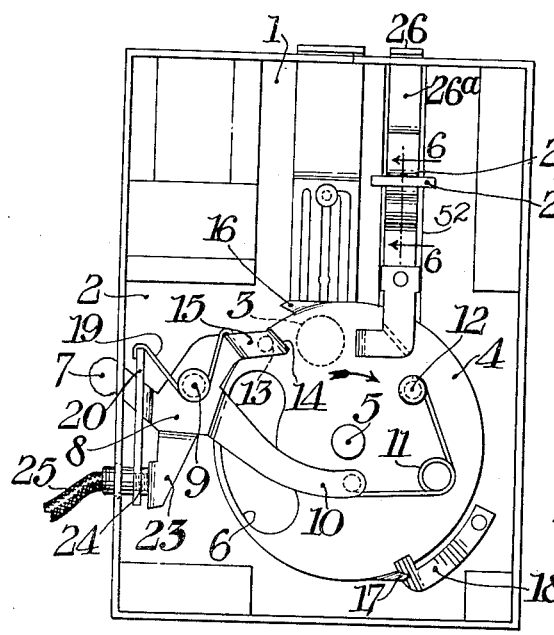
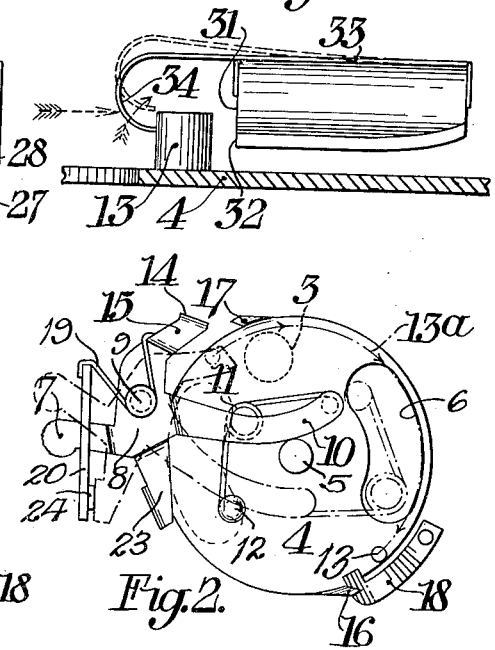
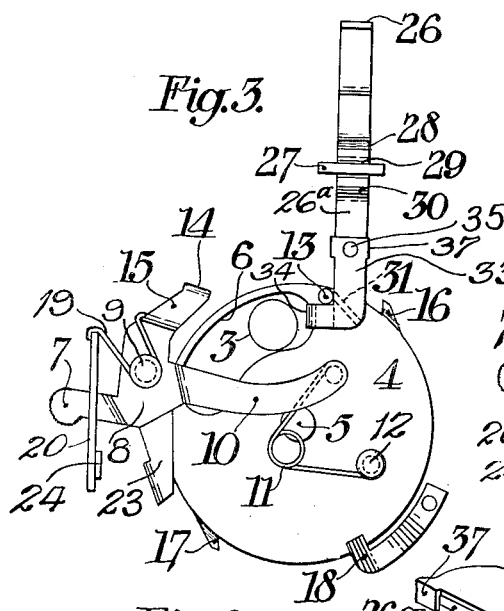
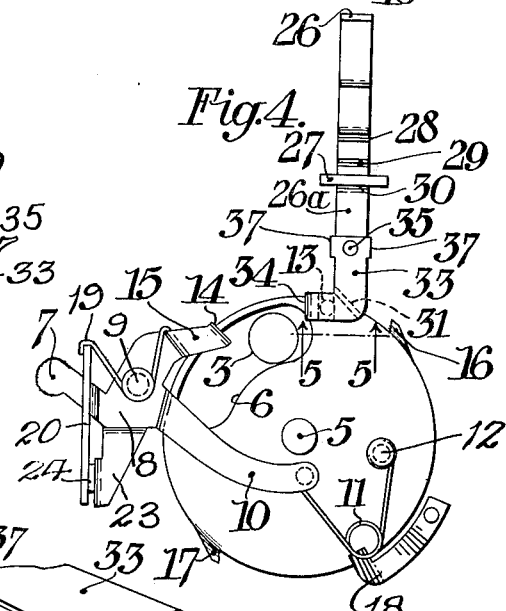
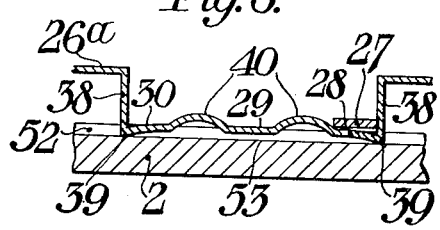
Inventor:
William A. Riddell,
By Newton M. Perins
Donald H. Stewart
Attorneys Patented July 11, 1933

1,917,330

UNITED STATES PATENT OFFICE

WILLIAM A. RIDDELL, OF ROCHESTER, NEW YORK, ASSIGNOR TO EASTMAN KODAK COMPANY, OF ROCHESTER, NEW YORK, A CORPORATION OF NEW YORK

PHOTOGRAPHIC SHUTTER CONTROL

Application filed February 13, 1932. Serial No. 592,741.

This invention relates to photography and more particularly to photographic shutters. One object of my invention is to provide a shutter which is very simple in construction with a control which will permit instantaneous, time, or bulb exposures. Another object of my invention is to provide a single lever for time and bulb exposures and to provide a setting means by which the lever may be resiliently latched in its set position. Another object of my invention is to provide a simple type of lever for controlling the shutter, this lever being provided with a snap latch for positively holding the shutter blade in one position and being provided with a stop or abutment cooperating with the snap latch for time exposures and with the shutter blade for producing bulb exposures. Still another object of my invention is to provide a resilient support for the shutter controlling lever by which it may be retained in any set position and other objects will appear from the following specification, the novel features being particularly pointed out in the claims at the end thereof.

Coming now to the drawing, wherein like reference characters denote like parts throughout:

Fig. 1 is a front elevation of a simple type of camera shutter with the shutter cover plate removed and with the parts in position for an instantaneous exposure;

Fig. 2 is a view similar to Fig. 1 but with the trigger moved to make an instantaneous exposure, the shutter blade having passed the exposure aperture in this view;

Fig. 3 is a fragmentary view showing the control lever positioned for bulb exposures;

Fig. 4 is very similar to Fig. 3 but with the parts shown in position for a time exposure;

Fig. 5 is a fragmentary detail showing a portion of the control lever and the snap latch construction of the shutter engaging end of the lever;

Fig. 6 is a cross section on lines 6—6 of Fig. 1; and

Fig. 7 is a fragmentary detail view of the shutter engaging end with the portion of the spring latch member removed.

Referring to Fig. 1 the camera may be of the inexpensive box type designated broadly as 1. The front board 2 is provided with an exposure aperture 3. An objective lies in this aperture and forms an image of an object being photographed when the shutter blade 4 is turned upon its pivot 5 so that the exposure may be made through the exposure aperture 6.

With the parts shown in Fig. 1 an exposure may be made by depressing the trigger 7. This turns the three-armed lever 8 upon its pivot 9 moving the long arm 10 in such a manner that the hair-pin spring 11 is tensioned and released and its connection at 12 with the shutter blade 4 causes the shutter blade to turn in the direction shown by the arrow. The first part of the movement of lever 8 merely tensions the spring as the shutter blade 4 cannot turn because of the pin 13 which is engaged behind the hook-like portion 14 of arm 15 of lever 8.

However, if the trigger 7 is pressed downwardly the hook-like member 14 releases pin 13 and allows it to move rapidly through the path 13a indicated in Fig. 2 until a lug 16 on the shutter blade 4 snaps under the spring latch 18. This is the action which occurs in making an instantaneous exposure after the trigger 7 is depressed. However, when the trigger is released a spring 19 pressing on a fixed plate at one end and on the arm 15 of the lever at the other end returns the trigger to its normal position, thus tensioning the spring 11 for a second time and causing the shutter blade 4 to continue rotating in the same direction until the position shown in Fig. 1 is reached. It is then in position for another exposure.

As thus far described the shutter is similar to the shutter shown in Patent No. 1,831,791, Mihalyi, November 10, 1931.

Lever 8 has a third arm 23 which lies beneath a threaded opening 24 in such a manner that if desired a cable release 25 may be used to actuate the shutter. This construction forms no part of my present invention.

In photographic shutters a so-called "bulb exposure" is an exposure in which the trigger is depressed in one direction to open the shutter and is returned to its initial position to close the shutter.

With the parts in the position shown in Fig. 1 if it is desirable to perform a bulb exposure—that is, an exposure in which movement of the trigger in one direction opens the shutter and movement of the trigger in the other direction closes the shutter, the controlling arm handle 26 shown in Fig. 1 is drawn outwardly until the cross bar 27 best shown in Fig. 6 lies in the recess 29.

It will be noticed from this figure that the arm 26a is provided with a downwardly formed portion equipped with three recesses 28, 29 and 30. When the parts are in the position shown in Fig. 1 the strap 27 lies in recess 28. In this position the shutter may make an instantaneous exposure.

When the strap 27 lies in the depression 29 due to drawing out on the handle 26, the shutter parts are in position for bulb exposure and when the handle 26 has been drawn out still further to move the arm 26a under the strap so that the strap will lie in depression 30, the shutter will be positioned for time exposures.

Having positioned the shutter for bulb exposures with the strap 27 lying in the depression 29 when the trigger 7 is depressed to release the pin 13 and to tension the spring 11 the shutter blade will turn until the pin 13 strikes the stop 31. As best shown in Fig. 7 the stop 31 consists of a downwardly bent portion on the end 32 of the arm 26a. This downwardly formed portion normally lies beneath the metal spring member 33 which as best shown in Fig. 5 is provided with a curved snap latch 34, this latch being spaced to one side of the stop 31.

As soon as the trigger 7 is released the shutter blade will turn in a reversed direction upon its pivot 5 to the initial position of rest shown in Fig. 1. Thus the shutter aperture 6 will permit light passing through the opening 3 as long as the trigger is depressed and as soon as it is released the opening 3 will be closed.

In order to make a time exposure the handle 26 is drawn out to its outward position so that strap 27 will lie in the depression 30. In this position the parts are relatively located as shown in Fig. 4. When thus drawn out the snap latch consisting of the light spring 34, which is bent over as shown in Fig. 5 and which is attached by means of a rivet 35 to the lever 26a lies in the path of the shutter pin 13. By depressing the trigger 7 the spring 11 is tensioned, the pin 13 is released from the hook 14 and the shutter is allowed to turn until the pin 13 snaps under the spring hook 34. The 34 holds the pin from rearward movement while the edge 32 of the arm 26a forms a stop preventing movement of the pin 13 in an opposite direction. Thus the pin 13 is held against movement after the first depression of the trigger.

Releasing the trigger and permitting it to return to its normal position does not release the pin from the snap latch. The opening 6 of the shutter is therefore retained in front of the opening 3 so that an exposure will continue until the handle 26 is depressed and the strap 27 reaches the seat 29 or the seat 28. Ordinarily, of course, to complete a time exposure the handle 26 would be pressed down to the camera body or to the full extent of its movement. This is useful because time exposures are used much less often than instantaneous exposure and by completing a time exposure in this manner the shutter will automatically be set for instantaneous exposures.

It should be noted that the spring arm 33 is equipped with a pair of downwardly extending lugs 37 which engage each side of the arm 26a so as to prevent the latch from turning upon the arm 26a.

In order to properly hold the arm 26a in a set position the seats 28, 29 and 30 are formed on a curved portion extending between two downwardly portions 38 of the arm. Thus the arm bears on the front board 2 only on the outward ends 39 and the portion lying between these points of contact are resilient. The movement of the ends 39 is guided by the walls 52 of the slot 53 cut in the front board 2 and the strap 27 extends across this slot. Between the seats there are curved up areas 40 which tend to flatten out as the lever is moved so that the strap rides over these curved portions as they bend inwardly toward the lens board 2 and the arm snaps into any one of the three positions which are necessary for instantaneous, time and bulb exposure. It will thus be seen that the arm 26a has only a two point sliding contact with the lens board 2 and this serves to provide a resilient portion between the two points of contact for the triple snap latch.

Having thus described my invention, what I claim as new and desire to secure by Letters Patent of the United States is:

1. In a camera shutter the combination with a shutter blade, and a pivotal support for the blade, of a spring for driving said blade, a trigger for controlling the blade and a movable arm adapted to engage a part of the shutter blade for time and bulb exposures, said arm including a stop, and a spring latch associated with the stop, and means for moving the arm to permit either the stop or the stop and latch to be positioned to cooperate with said shutter blade and trigger for time or bulb exposures.

2. In a camera shutter the combination with a shutter blade, and a pivotal support for the blade, of a spring for driving said blade, a trigger for controlling the blade and a movable arm adapted to engage a part of the shutter blade for time and bulb exposures, said lever including a stop, and a spring latch associated with the stop, said spring latch comprising a spring metal band extending to one side of the movable arm and spaced from the said stop a distance sufficient to confine said shutter part and retain it against movement until said movable arm is moved.

3. In a camera shutter the combination with a shutter blade, and a pivotal support for the blade, of a spring for driving said blade, a trigger for controlling the blade and a movable arm adapted to engage a part of the shutter blade for time and bulb exposures, said arm being formed of a bent metal strip having two point contact with the camera, and means for controlling the position of the arm including a series of seats formed between the two points of contact, and a strap extending across and being adapted to snap into one of said seats at a time.

4. In a camera shutter the combination with a shutter blade, and a pivotal support for the blade, of a spring for driving said blade, a trigger for controlling the blade and a movable arm adapted to engage a part of the shutter blade for time and bulb exposures, said arm being formed of a bent metal strip having two point contact with the camera, a pair of formed up portions between the two points of contact with three depressed seats in between, and means carried by the camera adapted to snap into a seat to hold said arm in a set position.

5. In a camera including a grooved wall supporting a shutter, the combination with a shutter blade, and a pivotal support for the blade, of a spring for driving said blade, a trigger for controlling the blade and a movable arm adapted to engage a part of the shutter blade for time and bulb exposures, said arm sliding in said groove in the camera wall and having contact with the groove, and a member extending across the groove to engage portions of the arm lying in the groove to position the arm for the different exposures.

Signed at Rochester, New York, this 5th day of February 1932.

WILLIAM A. RIDDELL.